US011040470B2

(12) United States Patent
Moarefi

(10) Patent No.: US 11,040,470 B2
(45) Date of Patent: Jun. 22, 2021

(54) 3D-PRINTED (LATTICE STRUCTURED) METAL-PLASTIC MATRIX COMPOUND MATERIAL

(71) Applicants: Hyundai Motor Company, Seoul (KR); KIA Motors Corporation, Seoul (KR)

(72) Inventor: Bahman Moarefi, Ruesselsheim am Main (DE)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 16/402,795

(22) Filed: May 3, 2019

(65) Prior Publication Data

US 2020/0254661 A1 Aug. 13, 2020

(30) Foreign Application Priority Data

Feb. 13, 2019 (DE) .......................... 102019201896.3

(51) Int. Cl.
*B29C 45/14* (2006.01)
*B33Y 70/00* (2020.01)
(Continued)

(52) U.S. Cl.
CPC .............. *B29C 45/14* (2013.01); *B23K 26/34* (2013.01); *B23K 26/354* (2015.10); *B33Y 70/00* (2014.12); *B33Y 80/00* (2014.12); *B29K 2077/00* (2013.01); *B29K 2705/02* (2013.01); *B29K 2705/12* (2013.01); *B33Y 10/00* (2014.12); *Y10T 428/24273* (2015.01)

(58) Field of Classification Search
CPC ...... B29C 45/14; B23K 26/354; B23K 26/34; B33Y 70/00; B33Y 80/00; B33Y 10/00; Y10T 428/24273; B29K 2705/02; B29K 2705/12; B29K 2077/00
See application file for complete search history.

(56) References Cited

U.S. PATENT DOCUMENTS

2002/0192101 A1* 12/2002 Vaidyanathan ....... C04B 38/065
419/2
2016/0237828 A1 8/2016 Burd
(Continued)

FOREIGN PATENT DOCUMENTS

DE       10358295 B4    11/2009
WO   WO 2017/102943 A1    6/2017

OTHER PUBLICATIONS

[NPL-1] Molitch-Hou, Michael; "Branch Technology is 3D Printing the Future of Construction One Wall at a Time". 3D Printing Industry (Jul. 28, 2015), <https://3dprintingindustry.com/news/branch-technology-is-3d-printing-the-future-of-construction-one-wall-at-a-time-54149/>. (Year: 2015).*

*Primary Examiner* — David Sample
*Assistant Examiner* — Donald M Flores, Jr.
(74) *Attorney, Agent, or Firm* — Brinks Gilson & Lione

(57) ABSTRACT

The present disclosure relates to a method of producing a compound material comprising at least one metal and at least one polymer, a compound material comprising at least one metal and at least one polymer, comprising a 3D-lattice of the at least one metal and a polymer introduced into the 3D-lattice, a component for a vehicle comprising the compound material and a vehicle comprising the component.

8 Claims, 2 Drawing Sheets

(51) Int. Cl.
B33Y 80/00 (2015.01)
B23K 26/354 (2014.01)
B23K 26/34 (2014.01)
B29K 705/12 (2006.01)
B33Y 10/00 (2015.01)
B29K 77/00 (2006.01)
B29K 705/02 (2006.01)

(56) References Cited

U.S. PATENT DOCUMENTS

2016/0263822 A1* 9/2016 Boyd, IV ............... B23K 26/00
2017/0217088 A1* 8/2017 Boyd, IV .............. B29C 64/106

* cited by examiner

3D-PRINTED (LATTICE STRUCTURED) METAL-PLASTIC MATRIX COMPOUND MATERIAL

CROSS-REFERENCE TO RELATED APPLICATION

The present application claims priority to and the benefit of German Patent Application No. 102019201896.3, filed Feb. 13, 2019, the entire contents of which is incorporated herein by reference.

FIELD

The present disclosure relates to a method of producing a compound material comprising at least one metal and at least one polymer, a compound material comprising at least one metal and at least one polymer, comprising a 3D-lattice of the at least one metal and a polymer introduced into the 3D-lattice, and a component for a vehicle comprising the compound material and a vehicle comprising the component.

BACKGROUND

The statements in this section merely provide background information related to the present disclosure and may not constitute prior art.

Reducing vehicle weight may reduce fuel consumption and therefore decrease the impact on the environment. In order to reduce weight in automotive parts, composite materials of metal and plastic have been developed.

For example, DE 10358295 B4 discloses a lightweight composite material provided with a lightweight carrier material, and a cover layer provided on at least one flat surface of the carrier material.

In US 20160237828 A1 a method of building an article by a layer-by-layer additive manufacturing process is described.

The disclosure disclosed in WO 2017/102943 A1 relates to a process of manufacturing a plastic-metal hybrid part by plastic overmolding on a metal surface via nano-molding technology (NMT).

All these methods leave room for improvement, though, particularly regarding structuring of composite materials.

SUMMARY

The recent development of 3D-printing technology has had an impact in the automotive sector and led to a growth in application thereof, particularly as a key point in lightweight design. Due to the design freedom in 3D-printing it is possible to design hollow structures, instead of full solid parts to achieve a high lightweight index.

One structural design of a 3D-lattice of at least one metal as can be provided with 3D printing can be seen in FIG. 2.

However, in such parts, there can be a lack of sealability against fluids like water, local forces could break the part locally, and due to the lattice structure brittleness could be higher.

The inventor has found that a compound material of 3D-printing metal and a polymer, particularly as a matrix, can be made from which components can be produced that have a good seal against fluids with increased local stiffness and increased ductility, particularly by injecting the polymer, e.g. a plastic. For example, a weight reduction of 30% or more compared to a solid metal of the same volume and a stiffness increase of 10% or more compared to the 3D-lattice of the metal without the polymer can be obtained by obtaining the metal lattice with the polymer.

In a first aspect a method of producing a compound material comprising at least one metal and at least one polymer is disclosed, comprising 3D-printing a 3D-lattice of the at least one metal; and introducing the at least one polymer into the 3D-lattice.

A second aspect of the present disclosure relates to a compound material comprising at least one metal and at least one polymer, comprising a 3D-lattice of the at least one metal and a polymer introduced into the 3D-lattice, wherein the amount of metal is in a range between and including about 10 vol. % and about 80 vol. %, or between and including about 15 vol. % and about 70 vol. %, or between and including about 20 vol. % and about 65 vol. %, or between and including about 30 vol. % and about 60 vol. %, and wherein the 3D-lattice of the at least one metal comprises holes and/or pores whose difference in diameter is at most 35%, or at most 30%, or at most 25%, or at most 20%.

A third aspect of the present disclosure is directed to a component for a vehicle, comprising the compound material of the present disclosure.

Furthermore, a fourth aspect of the present disclosure discloses a vehicle, comprising the component for a vehicle of the present disclosure.

Further aspects of the disclosure are disclosed in the dependent claims and can be taken from the following description and examples, without being limited thereto.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
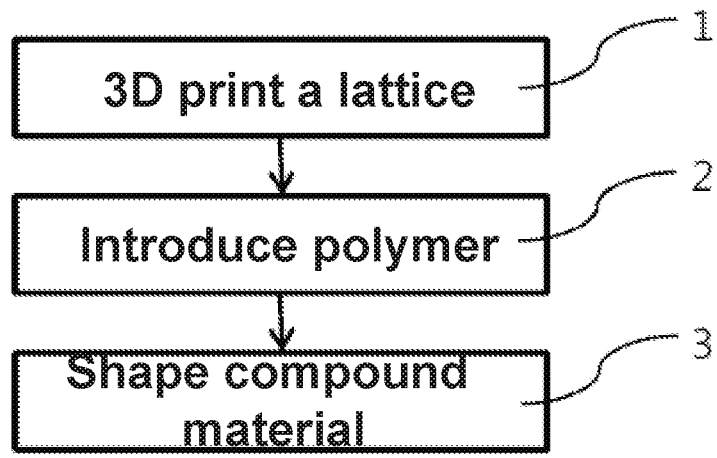
FIG. 1 shows schematically a method of the present disclosure.
Figure 2:
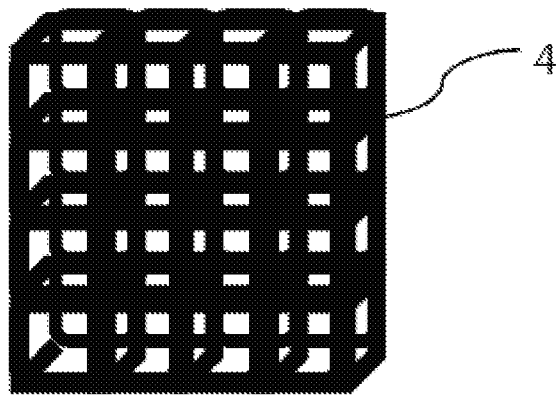
FIG. 2 is a schematic view of a metal lattice.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Unless defined otherwise, technical and scientific terms used herein have the same meaning as commonly understood by one of ordinary skill in the art to which this disclosure belongs.

A lattice is an open framework made up of criss-crossed patterns and/or strips and/or wires that can be regular or irregular. According to certain aspects the lattice is regular. In the lattice thicknesses of strips and/or wires forming the lattice is not particularly restricted, and/or the size of openings is not particularly restricted. The openings can have a regular or irregular shape. According to certain aspects, corners in the lattice are substantially rounded off, i.e. there is essentially no angle in the corners of the network between different connecting strips and/or wires bigger than 30°, or bigger than 20°, or bigger than 15°. This does not exclude, though, that different angles may be present in the lattice between two strips and/or wires. The angles, openings, strips, wires, etc. can be properly designed by a suitable program that controls the 3D-printer. While the above lattice is described with regard to two dimensions, the 3D-lattice produced in the present method, respectively comprised in the present compound material, can also show the respective properties in three dimensions, e.g. have substantially rounded corners in three dimensions, i.e. there is essentially no angle in the corners of the network between different connecting strips and/or wires bigger than 30°, or bigger than 20°, or bigger than 15° in three dimensions in the 3D-lattice as well. Again, though, different angles can be present in the lattice between two strips and/or wires. Further, the 3D-lattice may also be substantially an open framework or an open network, i.e. does not contain any closed off areas that cannot be penetrated by the at least one polymer. The type of network is not particularly restricted, and it can be regular or irregular. When the network is regular, it may have repeating structures within the lattice, respectively the 3D-lattice.

All values given in the present disclosure are to be understood to be complemented by the word "about", unless it is clear to the contrary from the context.

As used herein, wt. % is to be understood as weight percent. In the present disclosure, all amounts are given in wt. %, unless clearly stated otherwise or obvious from context. In the present disclosure, furthermore all amounts given in wt. % in a particular variation add up to 100 wt. %. Likewise, all amounts given in vol. % in a particular variation add up to 100 vol. %. The weight percent, respectively volume percent, are thereby calculated by dividing the mass, respectively volume, of each component by the total mass, respectively volume, in the respective aspect, unless indicated otherwise or clear from context.

In a first aspect the present disclosure relates to a method of producing a compound material comprising at least one metal and at least one polymer, comprising 3D-printing a 3D-lattice of the at least one metal; and
introducing the at least one polymer into the 3D-lattice.

In the present method the 3D-printing is not particularly restricted and can be carried out in any suitable way used for printing metal in a 3D-printing process. For example, it can be done by laser melting, e.g. selective laser melting. Also, the 3D-lattice produced by the 3D-printing is not particularly restricted as long as a 3D-lattice is produced. The printing can be done any suitable way with any basic material comprising at least one metal, e.g. comprising or consisting of one or more metals, for example comprising or consisting of one metal.

Further, the at least one metal is not particularly restricted as long as it can be printed by 3D-printing. According to certain aspects, the at least one metal comprises aluminium, steel and/or titanium. According to certain aspects, the at least one metal is aluminium, titanium, and/or steel, e.g. aluminium.

In addition, also the introducing of the at least one polymer into the 3D-lattice is not particularly restricted. While it is not excluded that the polymer is only forming inside the 3D-lattice, e.g. by a polymerization reaction which is not particularly restricted, according to certain aspects the polymer is already formed outside the 3D-lattice, e.g. provided as a bulk polymer, molten and introduced into the 3D-lattice.

The introducing into the 3D-lattice can be carried out in a way that the 3D-lattice is only partially filled by the at least one polymer, e.g. with at least 20 vol. %, e.g. at least 50 vol. %, e.g. at least 70 vol. %, or at least 80 vol. %, or at least 90 vol. % of the void spaces in the 3D-lattice. According to some aspects, the 3D-lattice of the at least one metal is essentially filled by introducing the at least one polymer, i.e. filled with at least 95 vol. %, or at least 98 vol. %, or at least 99 vol. %, e.g. at least 99.5, 99.8 or 99.9 vol. % of the void (empty) space in the 3-D lattice. It is not excluded that also the surface of the 3D-lattice is covered by the at least one polymer and optionally smoothened. Of course also more than one polymer can be introduced in one or more different introducing steps. According to certain aspects one polymer is introduced in the 3D-lattice. After introducing the at least one polymer, it is not excluded that the compound material is further covered, e.g. with a cover layer of a different material, e.g. one or more polymer.

According to certain aspects, the introducing of the at least one polymer is carried out by injection, in some aspects injection molding. The injection is not particularly restricted, and it can be e.g. done by dipping the 3D-lattice into the molten at least one polymer or pouring the at least one polymer onto the lattice. For the introduction of the at least one polymer into the 3D-lattice, the 3D-lattice can be in a shape fitting the 3D-lattice, for example, with one or more openings and/or exits for introducing the at least one polymer. In such aspects at least one polymer may be formed beforehand, so that no big changes in size occur, as is e.g. possible in a polymerization reaction. Also the injection molding is not particularly restricted and the 3D-lattice can be introduced in a suitable form. This way a further processing after the polymer has hardened can be reduced.

According to certain aspects, the at least one polymer is introduced into the 3D-lattice at a pressure of at least 10 MPa, or at least 15 MPa, or at least 20 MPa. The introduction at a higher pressure may enable better filling of the 3D-lattice, particularly when the openings and/or holes in the 3D-lattice are smaller. The pressure for introducing the at least one polymer therein can e.g. depend on the openings in the lattice, the at least one polymer applied, etc.

After introducing the at least one polymer it can be hardened, e.g. by cooling, and optionally post-processed, e.g. by milling, as described below.

The at least one polymer that is introduced is not particularly restricted as long as it can be introduced. According to certain aspects, the at least one polymer comprises at least one thermoplastic polymer which is not particularly restricted. Thermoplasts can be molten and can sufficiently retain a certain volume. Thermoplasts comprise e.g. acrylic, acrylonitrile butadiene styrene (ABS), polyamide, polylactic acid (PLA), polybenzimidazole, polycarbonate, polyether sulfone, polyoxymethylene, polyetherether ketone, polyetherimide, polyethylene, polyphenylene oxide, polyphenylene sulfide, polypropylene, and polystyrene. According to some aspects, the at least one polymer is selected from the group consisting of acrylonitrile butadiene styrene (ABS), polyethylene (PE), polypropylene (PP), polystyrene (PS), polyamide (PA), polycarbonate (PC), polyoxymethylene (POM), and (meth)acrylate. With these polymers sufficient hardness, ductility and lightweight can be achieved.

According to certain aspects the at least one polymer comprises or consists of at least one plastic. A plastic is a material consisting of any of a wide range of synthetic or semi-synthetic organic compounds that are malleable and so can be molded into solid objects.

According to certain aspects, the method further comprises shaping the compound material into a desired shape, in some aspects including at least one milling step. The shaping is not particularly restricted and can comprise usual shaping process, e.g. as in usual processes for producing vehicle parts, for example in the automotive sector. An exemplary shaping process can e.g. comprise a milling step which is not particularly restricted. The compound material can be easily shaped as it may be essentially homogeneous or homogeneous due to a regular structure in the 3D-lattice, thus enabling a shaping with reduced occurrence of breaking, cracking, chipping of during shaping, or even avoiding it at all.

Figure 3:
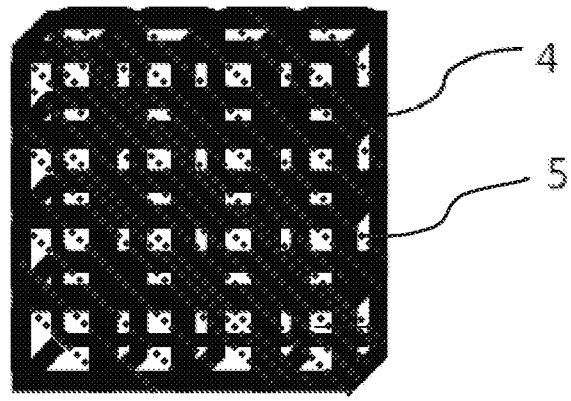
FIG. 3 depicts a metal lattice impregnated with a polymer, as can be produced by the present method.

An exemplary method of the present disclosure is shown schematically in FIG. 1. In a step 1 3D-printing of a 3D-lattice of the at least one metal is carried out. Afterwards, in step 2 the at least one polymer is introduced into the 3D-lattice, e.g. by melting, injecting and hardening. In the optional step 3 the compound material is then shaped, e.g. by milling. As a result, compound material as schematically shown in FIG. 3 can be obtained, wherein the at least one polymer 5 is contained in the 3D-lattice of the at least one metal 4.

According to certain aspects, the amount of metal is in a range between and including about 10 vol. % and about 80 vol. %, or between and including about 15 vol. % and about 70 vol. %, or between and including about 20 vol. % and about 65 vol. %, or between and including about 30 vol. % and about 60 vol. %. If the amount of the at least one metal is too low, no sufficient hardness and/or stiffness can be obtained. If the amount of the at least one metal is too high, the weight reduction is too little and ductility may be reduced.

According to certain aspects, the 3D-lattice of the at least one metal comprises holes and/or pores whose difference in diameter is at most 35%, or at most 30%, or at most 25%, or at most 20%. If the difference is too big, a homogeneous and/or essentially complete or complete filling of the 3D-lattice may be difficult to achieve, leading possibly to remaining pores.

According to certain aspects, a minimum radius in holes and corners of the 3D-lattice of the at least one metal is 0.20 mm or more, or 0.25 mm or more. If the radius is too small, a complete filling of corners and/or holes may be difficult to achieve. For different polymers, different minimum radius may apply, optionally together with different pressures for introducing the at least one polymer. However, if the radius is too big, of course the minimum amount of the at least one metal may not be contained anymore. The measurement of the radius will be described below.

Table 1 shows different recommended minimum radii and pressures for different polymer materials and 99% filling of the void volume in the 3D-lattice.

TABLE 1 mimimum recommended radius and pressure for different polymer materials

| Plastic Material | Minimum recommended radius | Recommended pressure needed to fill compound material 99% full* |
|---|---|---|
| ABS | 0.6 mm | 800 Bar |
| Polypropylene (PP) | 0.35 mm | 300 Bar |
| Polystyrene (PS) | 0.45 mm | 500 Bar |
| Polyamide (PA), e.g. PA6 | 0.25 mm | 200 Bar |
| Polycarbonate (PC) | 0.5 mm | 600 Bar |
| Acetal (POM) | 0.40 mm | 400 Bar |
| Acrylic | 0.35 mm | 300 Bar |

*based on the void volume in the compound material

When designing the 3D-lattice, the at least one polymer to be applied thus should be considered according to certain aspects. For example, the viscosity of the molten at least one polymer can be considered by designing the shape of hollow spaces, e.g. angles, size, etc. Of course a suitable viscosity also can be e.g. achieved by choosing a suitable polymer and/or introduction temperature, depending on the at least one polymer. In some aspects, all holes inside the 3D-lattice may be connected to each other, i.e. essentially no (less than 5 vol. %, based on the void/empty volume in the 3D-lattice) or no dead ends should be contained so that the at least one polymer can enter all hollow areas.

Figure 4:
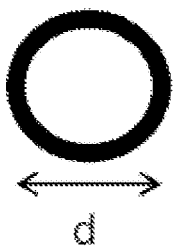
FIG. 4 illustrates diameters d for round holes in a metal lattice part.
Figure 5:
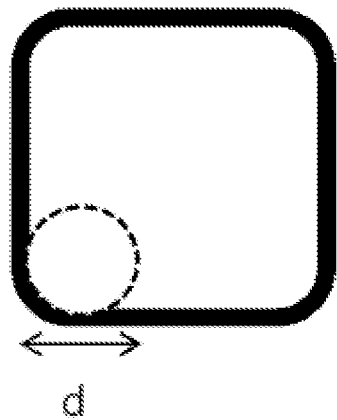
FIG. 5 illustrates virtual circles in corners of holes of any shape in a metal lattice part.

For determining the minimum radius in holes and corners, as given above, two different shapes can be considered. For round shapes, as shown schematically in FIG. 4, the radius is ½ of the inner diameter d of the hole, e.g. 0.25 mm for polyamide. If the hole is not circular, the radius can be determined by fitting a circle inside the curvature and determine ½ of its diameter d, as exemplarily shows in FIG. 5. While FIG. 5 shows two strips and/or wires of the lattice at about a 90° angle, of course fitting of a circle in the curve can also be suitably carried out for other angles, thus also other shapes. Due to plastic viscosity of the at least one polymer the angles of inside holes and/or curvatures may be thus considered when designing the lattice structure. For filling with the at least one polymer, all openings and holes in the 3D lattice may be connected to each other As stated above, to achieve good filling of the 3D-lattice structure by the at least one polymer, at least the minimum radius of the hole structures and the pressure during introduction of the at least one polymer, e.g. a molding pressure, should be considered due to different viscosity of the at least one polymer.

It is not excluded in the present method that the at least one metal is treated after 3D-printing to produce a lattice thereof and before introducing the at least one polymer. For example, an electro-coating of the metal or a similar process can be applied. In this way the metal can be passivated against external influences, e.g. oxidation, which can be particularly useful as the surface of the metal is increased during 3D-printing.

Alternatively it is of course also not excluded that the 3D-printing is the only step before introducing the at least one polymer. In such a case it is also possible that 3D-printing is either carried out in air or in an inert atmosphere.

A second aspect of the present disclosure relates to a compound material comprising at least one metal and at least one polymer, comprising a 3D-lattice of the at least one metal and a polymer introduced into the 3D-lattice, wherein the amount of metal is in a range between and including about 10 vol. % and about 80 vol. %, or between and including about 15 vol. % and about 70 vol. %, or between and including about 20 vol. % and about 65 vol. %, or between and including about 30 vol. % and about 60 vol. %, and wherein the 3D-lattice of the at least one metal comprises holes and/or pores whose difference in diameter is at most 35%, or at most 30%, or at most 25%, or at most 20%.

The present compound material can particularly be produced by the method of the present disclosure. Thus, aspects described with respect to the present method also apply to the compound material of the present disclosure.

In some aspects, all holes inside the 3D-lattice may be connected to each other, i.e. essentially no (less than 5 vol. %, based on the void/empty volume in the 3D-lattice) or no dead ends should be contained so that the at least one polymer can enter all hollow areas.

According to certain aspects, a minimum radius in holes and corners of the 3D-lattice of the at least one metal is 0.20 mm or more, or 0.25 mm or more.

As stated above, for determining the minimum radius in holes and corners, as given above, two different shapes can be considered. For round shapes, as shown schematically in FIG. 4, the radius is ½ of the inner diameter d of the hole, e.g. 0.25 mm for polyamide. If the hole is not circular, the radius can be determined by fitting a circle inside the curvature and determine ½ of its diameter d, as exemplarily shows in FIG. 5. While FIG. 5 shows two strips and/or wires of the lattice at about a 90° angle, of course fitting of a circle in the curve can also be suitably carried out for other angles, thus also other shapes. Due to plastic viscosity of the at least one polymer the angles of inside holes and/or curvatures may be thus considered when designing the lattice structure. For improving filling with the at least one polymer, all openings and holes in the 3D-lattice may be connected to each other.

While the at least one metal and/or the at least one polymer are not restricted in the present compound material, according to certain aspects, the at least one metal comprises aluminium, steel and/or titanium, and/or the at least one polymer comprises at least one thermoplastic polymer, in some variations at least one polymer selected from the group consisting of acrylonitrile butadiene styrene (ABS), polyethylene (PE), polypropylene (PP), polystyrene (PS), polyamide (PA), polycarbonate (PC), polyoxymethylene (POM), and (meth)acrylate. According to certain aspects the at least one polymer comprises or is a plastic.

According to certain aspects, the compound material is shaped, e.g. as given above, e.g. in the shape of a part of a vehicle, e.g. an automobile.

A third aspect of the present disclosure relates to a component for a vehicle, comprising the compound material of the present disclosure. The component of the vehicle is not particularly restricted and can be e.g. a part of a car, e.g. of a chassis, a vehicle body, e.g. car body, a door of a vehicle, e.g. car, a closure of a vehicle, e.g. car, etc.

Furthermore, a fourth aspect of the present disclosure discloses a vehicle, comprising the component for a vehicle of the present disclosure. The vehicle is not particularly restricted and can be e.g. an automobile, a train, a ship, etc., e.g. a passenger car, a pickup, a van, a bus, a truck, etc. According to certain aspects the vehicle is an automobile.

The above aspects can be combined, if appropriate. Further possible implementations of the disclosure comprise also combinations of features not explicitly mentioned in the foregoing or in the following with regard to the examples of the disclosure. Particularly, a person skilled in the art will also add individual aspects as improvements or additions to the respective basic form of the disclosure.

EXAMPLES

The present disclosure will now be described in detail with reference to examples thereof. However, these examples are illustrative and do not limit the scope of the disclosure.

Example 1

A 3D-lattice with a minimum radius of 0.25 mm in holes and rounded corners is printed by 3D-printing of a metal like aluminium, steel and/or titanium, e.g. using a selective laser melting method. In the resulting 3D-lattice PA6 in a molten state is introduced at a pressure of about 200 bar (about 20 MPa) total pressure in order to fill the 3D-lattice at least 99% full (depending on the void volume) with the PA6. For determining the fill degree, e.g. slice of the filled 3D-lattice can be made and observed and analyzed microscopically.

In order to avoid damage on the lattice structure, very slowly increasing the pressure may be desirable, e.g. depending on the size design and thickness of the lattice and lattice parts in a time of 45 seconds to 2 hours, for example in a time from 1 minute to 1 hour. As noted above, for different polymer different geometries of the 3D-lattice structure and/or different pressures may be applied.

For introducing the PA6, the 3D-lattice can be e.g. put into the molten PA6 under pressure, or the 3D-lattice can be introduced into a shape and injection-molded with the molten PA6.

In some variations, the outside contour of the obtained part can be shaped, e.g. milled, to obtain a desired shape. After that the part can be post-treated, e.g. coated, etc., and the final compound material comprising a 3D-lattice of at least one metal filled with at least one polymer, here PA6, is obtained.

With the present disclosure, a compound material can be obtained that has advantageous properties, like a good sealing against fluids like water, a good spreading of a local impact force into the compound material, a decrease in local cracks, an increased local stiffness (e.g. ~10% compared to the lattice without the polymer), and an increased ductility due to introduction of the at least one polymer.

The invention claimed is:

1. A compound material comprising at least one metal and at least one polymer, comprising a 3D-lattice of the at least one metal and a polymer introduced into the 3D-lattice, wherein the amount of metal is in a range between and including about 10 vol. % and about 80 vol. %, with respect to the total volume of the compound material and wherein the 3D-lattice of at least one metal comprises a plurality of holes, a diameter of a largest hole of the plurality of holes being at most 35% larger than a diameter of a smallest hole of the plurality of holes, wherein the 3D-lattice comprises at least one rounded corner, a minimum radius in holes and corners of the 3D-lattice of the at least one metal is 0.20 mm or more, wherein the polymer fills at least 95 vol. % of remaining space excluding the 3D-lattice.

2. The compound material of claim 1, wherein a radius of each hole of the plurality of holes is at least 0.20 mm.

3. The compound material of claim 1, wherein the at least one metal comprises aluminium, steel or titanium.

4. The compound material of claim 1, wherein the at least one polymer comprises at least one thermoplastic polymer.

5. The compound material of claim 4, wherein the at least one thermoplastic polymer is selected from the group consisting of acrylonitrile butadiene styrene, polyethylene, polypropylene, polystyrene, polyamide, polycarbonate, polyoxymethylene, and (meth) acrylate.

6. The compound material of any of claim 1, wherein the compound material is shaped.

7. A component for a vehicle, comprising the compound material of claim 1.

8. A vehicle, comprising the component for a vehicle of claim 7.

* * * * *